United States Patent [19]

Knudsen et al.

[11] Patent Number: 5,032,242

[45] Date of Patent: Jul. 16, 1991

[54] TITANIUM DIBORIDE/BORON CARBIDE COMPOSITES WITH HIGH HARDNESS AND TOUGHNESS

[75] Inventors: Arne K. Knudsen; William Rafaniello, both of Midland, Mich.

[73] Assignee: The Dow Chemical Company, Midland, Mich.

[21] Appl. No.: 468,497

[22] Filed: Jan. 22, 1990

Related U.S. Application Data

[60] Division of Ser. No. 181,852, Apr. 15, 1988, Pat. No. 4,957,884, which is a continuation-in-part of Ser. No. 43,080, Apr. 27, 1987, abandoned.

[51] Int. Cl.$^5$ .................. B01J 19/12; C01B 35/04; C01B 31/36
[52] U.S. Cl. .................. 204/157.41; 423/289; 423/291; 423/297; 423/439; 501/87; 501/96
[58] Field of Search .................. 501/87, 96; 423/289, 423/291, 297, 439; 204/157.41

[56] References Cited

U.S. PATENT DOCUMENTS

| | | | |
|---|---|---|---|
| 4,275,026 | 6/1981 | Hazel et al. | 501/96 |
| 4,282,195 | 8/1981 | Hoekje | 501/96 |
| 4,689,129 | 8/1987 | Knudsen | 204/157.41 |

FOREIGN PATENT DOCUMENTS

| | | | |
|---|---|---|---|
| 0124901 | 11/1984 | European Pat. Off. | 204/157.41 |
| 86004524 | 8/1986 | World Int. Prop. O. | 204/157.41 |

*Primary Examiner*—William R. Dixon Jr.
*Assistant Examiner*—Anthony J. Green
*Attorney, Agent, or Firm*—Dan R. Howard

[57] ABSTRACT

A powder composition consisting essentially of an intimate mixture of boron carbide and titanium diboride, the mixture having an average particle size of less than about 0.5 micron, the particles being uniformly dispersed such that elemental analytical techniques show all discrete concentrations of boron carbide and titanium diboride to be less than or equal to about 0.5 micron in diameter, is disclosed. The powder is useful for making a densified ceramic composition comprising titanium diboride grains, having an average grain size of less than or equal to about 3 microns in diameter, uniformly dispersed with boron carbide grains, having an average grain size of less than about 5 microns in diameter. The densified composition exhibits improved hardness and toughness when compared wiht titanium diboride or boron carbide compositions. The powder can be prepared by a process comprising subjecting a stream of reactant gases consisting essentially of a volatile boron source, a volatile titanium source, a volatile carbon source, and a hydrogen source to an amount of laser radiation and at a pressure effective to convert at least a portion of the volatile boron, carbon and titanium sources to an intimate mixture of boron carbide and titanium diboride.

21 Claims, 3 Drawing Sheets

1000 Å

5 MICRONS

50 MICRONS

50 MICRONS

TITANIUM DIBORIDE/BORON CARBIDE COMPOSITES WITH HIGH HARDNESS AND TOUGHNESS

CROSS-REFERENCE TO RELATED APPLICATION

This is a divisional of application Ser. No. 181,852, filed Apr. 15, 1988, U.S. Pat. No. 4,957,884 which is a continuation-in-part of application U.S. Ser. No. 043,080, filed Apr. 27, 1987, abandoned.

BACKGROUND OF THE INVENTION

The present invention concerns titanium diboride/boron carbide composite powders, a process for preparing these powders, and densified ceramic compositions comprising titanium diboride and boron carbide.

One result of the study of composite materials has been the characterization of some of these as possessing properties which are significantly improved over the properties of the individual constituents. Ceramic composites in particular, including both fiber-reinforced and multicomponent structures, have been targeted as applicable to a variety of scientific and technological uses. Some of these uses include tooling applications, indenters, nozzles, and so forth. For these and other uses the desirable material should be as lightweight and as tough as possible; however, the attainment of one of these properties has often been accomplished at the expense of the other property.

Boron carbide has been found to exhibit excellent hardness and a relatively low specific gravity, but it lacks toughness ($K_{Ic}=3.6$ MN/m$^{3/2}$). Titanium diboride, on the other hand, is nearly as hard and much tougher when compared with boron carbide, but it is also much heavier. Because of the potentially complementary properties of these two materials, researchers have directed attention to producing composites comprising both compounds. Results of this research indicate that a ceramic produced therefrom approximates titanium diboride's toughness and exceeds boron carbide's hardness while maintaining a low specific gravity.

Research specifically directed toward titanium diboride/boron carbide composites has yielded, e.g., a 1952 patent, U.S. Pat. No. 2,613,154, which discloses the manufacture of titanium diboride/boron carbide composites from a mixture of boron-rich boron carbide and titanium powders. This method does not, however, appear to be suitable for producing a variety of titanium diboride/boron carbide compositions without the incorporation of excess carbon or boron in the densified piece. The same problem is encountered in connection with research done by Russian workers, as disclosed in E. V. Marek, "Reaction of the boron carbide with Group IV transition metals of the Periodic Table," *Mater. Izdeliya, Poluchaemye Metodom Poroshk. Metall., Dokl. Nauchn. Konf. Aspir. Molodykh Issled. Inst. Probl. Materialoved. Akad. Nauk Ukr. SSR*, 6th, 7th, Meeting Date 1972–1973, 156-9. This paper describes mixtures of boron, carbon and titanium which are hot-pressed to composites comprising B$_4$C and TiB$_2$ phases. A microhardness superior to that of either B$_4$C or the borides is reported.

The Japanese literature, notably Japanese Patent Application 1985-235764, discloses boron carbide/titanium diboride composites prepared by dispersing boron carbide powder and titanium diboride powder in organic solvents such as toluene, and ball milling using a tungsten carbide-cobalt alloy as a milling medium. This material is then dried and cold-pressed. The authors report a hardness approaching that of diamond for a sintered piece prepared from 40 to 50 percent titanium diboride.

Japanese workers also disclose, in U.S. Pat. No. 4,029,000, a boron carbide/titanium diboride composite, prepared from a physical mixture of powders, for use as an injection pump for molten metals. The particle diameter is in the range of 2 to 6 $\mu$m for the boron carbide and 5 to 15 $\mu$m for the titanium diboride. The hardness attained upon sintering is reported to be lower than that of boron carbide alone.

Research has also been directed toward other composites comprising titanium, boron and carbon. For example, the literature also describes various methods of preparing composite materials comprising titanium carbide and titanium borides. Among these are, e.g., U.S. Pat. Nos. 4,138,456 and 3,804,034, which describes preparation of a TiC/TiB$_2$ composite and a TiC/TiB/B$_4$C composite, respectively, produced from physical mixtures of powders. U.S. Pat. No. 4,266,977 discloses preparation of a composite prepared in a plasma reactor from an "intimate" mixture of the three constituents.

An important parameter in the ultimate utility of a ceramic composite is the degree to which the constituents are dispersed. To realize the maximum benefit of a particulate composite, the components must be uniformly distributed on a microscopic scale. However, such uniform distribution is at best extremely difficult to attain in physical mixtures, such as those produced using any of various milling techniques, in part because of agglomeration of component particles.

A further consideration in producing an "ideal" composite material relates to particle size. This is because the high incidence of failure in engineered ceramic parts can often be attributed to small cracks or voids, which result from incomplete packing of the precursor powders. An obvious solution to this problem would be to use extremely fine composite powders that are substantially uniform as to particle diameter. Such powders would pack more tightly and thereby reduce the number of void spaces formed in the ceramic body. It has been suggested by E. A. Barringer and H. K. Bowen, in "Formation, Packing and Sintering of Monodispersed TiO$_2$ Powders," *J. Amer. Ceram. Soc.* 65, C-199 (1982), that an "ideal" ceramic powder for producing a high quality part would be of high purity and contain particles which are monodispersed, i.e., substantially uniform as to size, and which are spherical, nonagglomerated, and fine in size (e.g., less than 1.0 $\mu$m).

As a ceramic powder is sintered, adjacent particles fuse into grains. In general, the grain size is governed by the particle size of the powder from which the part is prepared. In other words, the grain size is necessarily larger than the crystalites from which a part is sintered. Thus, the sintering of finer particles presents the opportunity to produce fine-grained bodies. This is especially important in TiB$_2$/B$_4$C composites, in which the TiB$_2$ and B$_4$C grain sizes should necessarily be less than or equal to about 10 microns in order to maximize the hardness and toughness of the composite. Thus, the particle sizes should be significantly smaller than 10 microns.

The effect of grain size on the integrity of boron carbide bodies having no titanium diboride constituent has been investigated by A. D. Osipov, I. T. Ostapenko, V. V. Slezov, R. V. Tarasov, V. P. Podtykan and N. F. Kartsev, "Effect of Porosity and Grain Size on the Mechanical Properties of Hot-Pressed Boron Carbide," *Sov. Powder Metall. Met. Ceram.* (Engl. Transl.) 21(1), 55-8 (1982). The authors found that parts exhibiting a fine grain size were significantly stronger than parts consisting of coarse grains.

An additional advantage in the use of ceramic powders with a small average particle size is that the temperatures required to sinter the powders are often reduced. For example, in their work on sintering titanium oxide powders Barringer and Bowen found that the sintering temperature could be reduced from a normal 1,300° C. to 1,400° C. range down to about 800° C. when using 0.08 micron-sized particles. On an industrial scale, this could result in a considerable saving in both material and energy costs.

One method of producing fine ceramic precursor powders is via gas-phase synthesis using a carbon dioxide laser. This method was first developed by Haggerty and coworkers. In the article, "Synthesis and Characteristics of Ceramic Powders Made From Laser-Heated Gases," *Ceram. Eng. Sci. Proc.* 3, 31 (1982), R. A. Marra and J. S. Haggerty describe the preparation of silicon, silicon carbide and silicon nitride powder from silicon hydride. The powders produced were fine, equiaxed and monodispersed with particle sizes in the range of 100 A to 1,000 A. Their paper also contains the statement that this laser-heated process can be used to produce other nonoxide ceramics such as titanium diboride, aluminum nitride and boron carbide, as well as many oxide ceramics.

However, in that article there is no specific teaching regarding the actual production of boron carbide using a laser. Later work by J. D. Casey and J. S. Haggerty, entitled "Laser-induced vapour phase synthesis of boron and titanium diboride powders," *J. Mat. Sci.* 22 (1987) 737-744, indicated that the $CO_2$ laser irradiation of a gaseous mixture of boron trichloride, hydrogen and titanium tetrachloride did not yield any titanium diboride. In sum, none of the described laser pyrolyses appear to have produced a titanium diboride/boron carbide composite powder of any kind in a single step, and certainly not one possessing the superior attributes and unique microstructure of the present invention.

SUMMARY OF THE INVENTION

Accordingly, there is provided a powder composition consisting essentially of an intimate mixture of boron carbide and titanium diboride, the mixture having an average particle size of less than about 0.5 micron, the particles being uniformly dispersed such that elemental analytical techniques show all discrete concentrations of boron carbide and titanium diboride to be less than or equal to about 0.5 micron in diameter. The present invention also comprehends a densified ceramic composition prepared from this powder composition and consisting essentially of titanium diboride grains, having an average grain size of less than or equal to about 3 microns in diameter, uniformly dispersed with boron carbide grains, having an average grain size of less than about 5 microns in diameter.

The present invention further provides a densified ceramic composition consisting essentially of boron carbide and titanium diboride phases wherein the boron carbide and titanium diboride grains show a dispersion which can be characterized as having an average coefficient of variation of the area percent of the minor phase, over a titanium diboride concentration range of from more than 1 percent to about 99 percent, which is less than or equal to about 10, as determined by scanning electron microscopic analysis at a magnification of 778× of 20 fields measuring 26×26 microns each.

The present invention also provides a densified ceramic composition consisting essentially of boron carbide and titanium diboride wherein the boron carbide and titanium diboride grains show a dispersion which can be characterized as having a range of the area percent of titanium diboride of less than about 9, as determined by scanning electron microscopic analysis at a magnification of 778× of 20 fields measuring 26×26 microns each.

Finally, there is also provided a process for preparing a boron carbide/titanium diboride composite ceramic powder which comprises subjecting a stream of reactant gases consisting essentially of a volatile boron source, a volatile titanium source, a volatile carbon source, and a hydrogen source to an amount of $CO_2$ laser radiation and at pressure effective to convert at least a portion of the volatile boron, carbon and titanium sources to an intimate mixture of boron carbide and titanium diboride. This powder can then be densified to form a densified ceramic part.

DESCRIPTION OF THE PREFERRED EMBODIMENTS

In general, the present invention comprises an intimately mixed, uniformly dispersed, high purity ceramic powder; the densified ceramic body produced therefrom; and a method of preparing the powder. This powder is designated herein as "TiBC". The selected term is indicative of the three elemental components, and is chosen because the powder is not necessarily a mixture of only distinguishable $TiB_2$ and $B_4C$ phases, such as would be produced by conventional milling techniques, but can comprise other phases as well. Conversely, the term "$TiB_2/B_4C$" is chosen to represent the densified composition, both to distinguish it from the powder composition and because predominantly discrete titanium diboride and boron carbide phases are present.

The powder composition can be described as being of high purity. This means that it is suitable for forming a densified composition which comprises preferably less than about 5 weight percent of compounds other than titanium diboride and boron carbide, more preferably less than about 3 weight percent, and most preferably less than about 1 weight percent. It is also characterized as being ultrafine. This means that the average particle size is preferably less than about 3 microns in diameter, more preferably less than about 0.5 micron, and most preferably less than about 500 Angstroms. A number of different methods have been employed to further characterize both the powder composition and the densified ceramic composition made therefrom, the results of which are detailed below.

Figure 1:
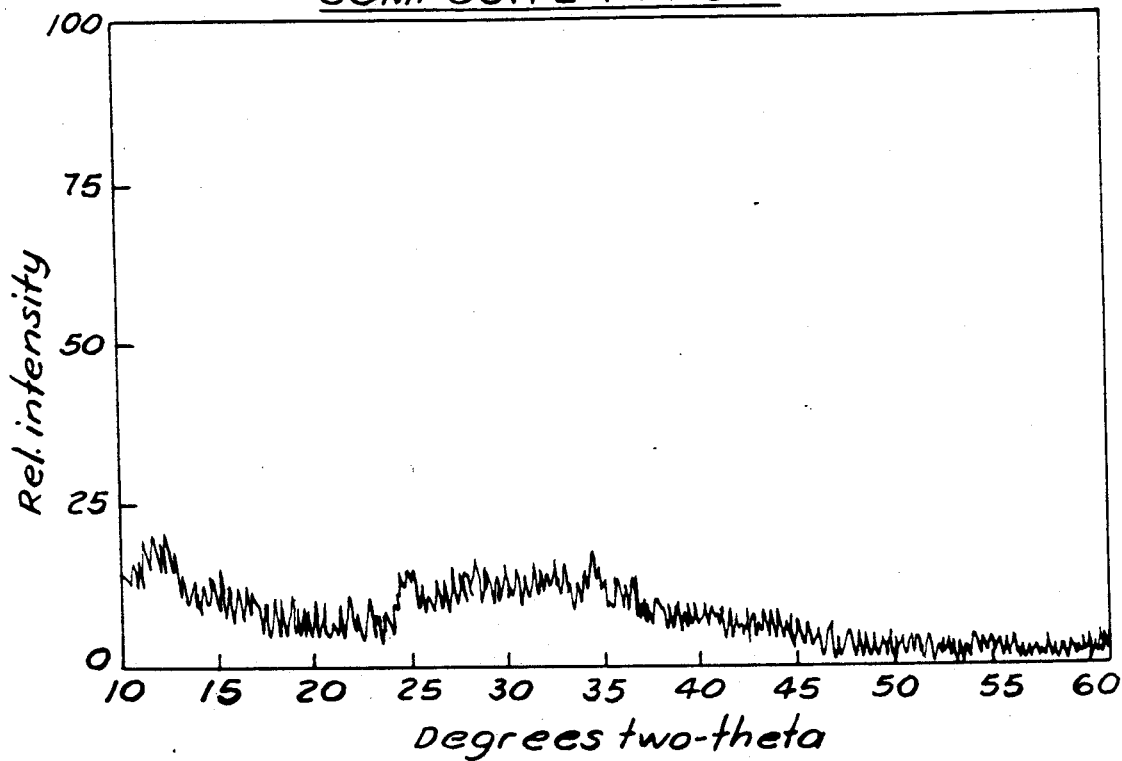
FIG. 1 is a drawing of an X-ray powder diffraction pattern obtained from a sample of the powder composition.

The results of a bulk X-ray powder diffraction analysis of the powder showed that it is predominantly non-crystalline, but that very minor amounts of crystalline materials are also present. The crystalline materials are $B_4C$, $TiB_2$ and $H_3BO_3$; however, it is believed that the $H_3BO_3$ is attributable to oxidation or hydrolysis of the powder in air. The X-ray powder diffraction pattern, illustrating the essentially amorphous character of the powder, is shown in FIG. 1. It is hypothesized that, upon heating of the powder in the region of about 1,800° C., bulk X-ray diffraction would show crystallinity.

The predominantly amorphous nature of powder is particularly interesting because it contrasts with the pattern obtained from separately laser-synthesized $TiB_2$ and $B_4C$ when the same reactant materials are used for each synthesis. In both cases the separate syntheses result in products displaying a weakly crystalline bulk X-ray diffraction pattern.

Electron Diffraction (ED) analysis was also performed on the powder. This was done by randomly searching a sample with a 1 micron SAED aperture. The result of this analysis is that the material is crystalline, in contrast with its amorphous characterization by bulk X-ray diffraction analysis. Crystalline phases include $B_4C$, organized into usually hexagonal particles of approximately 400 Angstroms average diameter, and $TiB_2$ particles, which are generally larger than the $B_4C$ particles. The $TiB_2$ is usually present as rods of approximately 870 Angstroms × 250 Angstrom average dimensions.

Figure 2:
FIG. 2 is a transmission electron micrograph (TEM) of the powder composition.

In addition to the distinguishable $TiB_2$ and $B_4C$ phases, ED analysis also showed two other significant components present in the powder composition. First, a substantial amount of boron-rich boron carbide, apparently corresponding to $B_8C$, is present. These particles, usually present in chains, measure from about 250 Angstroms to about 350 Angstroms, averaging about 280 A. Second, a minor amount of a titanium-rich material is also present. This is an extremely fine material that is not resolved by the ED analysis. FIG. 2 shows a transmission electron micrograph of the powder illustrating the particle size and uniform dispersion of constituents.

Electron Probe Analysis (EPA) at 400× was performed. The X-ray maps produced therefrom showed a uniform distribution, i.e., no localized concentrations greater than about 3 microns in diameter, of titanium, boron, carbon, oxygen and chlorine. The small amount of chlorine (0.4 percent by weight) is probably present as $TiCl_3$, while the oxygen is presumed to be attributable to surface oxidation or hydrolysis resulting either from exposure of the powder to air or its subsequent dispersal in aqueous media.

Thus, it is clear that the concurrent laser synthesis produces a powder and, therefore, a densified ceramic composition having unique physical and chemical properties. The unique properties become particularly apparent in the densified ceramic composition.

The powder can be hot-pressed by conventional methods to produce a densified ceramic body of low porosity, typically less than about 1 percent, and a Vickers microhardness of preferably greater than about 3,000 kg/mm$^2$ (1 kg load), more preferably greater than about 3,300 kg/mm$^2$ (1 kg load), and most preferably about 3,600 kg/mm$^2$ (1 kg load). This is significantly greater than the microhardness of either hot-pressed boron carbide or titanium diboride, which at the same load is about 3,000 kg/mm$^2$ and 2,600 kg/mm$^2$, respectively. Alternative methods of densification, such as hot isostatic pressing and pressureless sintering, can also be employed. Also showing improvement over the single phase materials is the fracture toughness, determined via the indentation method. This was found to be preferably more than about 5 MN/m$^{3/2}$, more preferably about 6.5–7.5 MN/m$^{3/2}$, for the $TiB_2/B_4C$ system, which therefore is potentially comparable to or greater than that of titanium diboride alone (6.3 MN/m$^{3/2}$) and of boron carbide alone (3.6 MN/m$^{3/2}$). Thus, the powder TiBC composition of the present invention yields a densified $TiB_2/B_4C$ composition possessing improved density and hardness and also, dependent on the weight percents of the two components, potentially low specific gravity. For example, if the amount of $TiB_2$ ranges from about 20 to about 30 percent by weight, the specific gravity of the densified part will be from about 2.76 to about 2.90 g/cm$^3$. $B_4C$ alone has a specific gravity of 2.52 g/cm$^3$.

Figure 3:
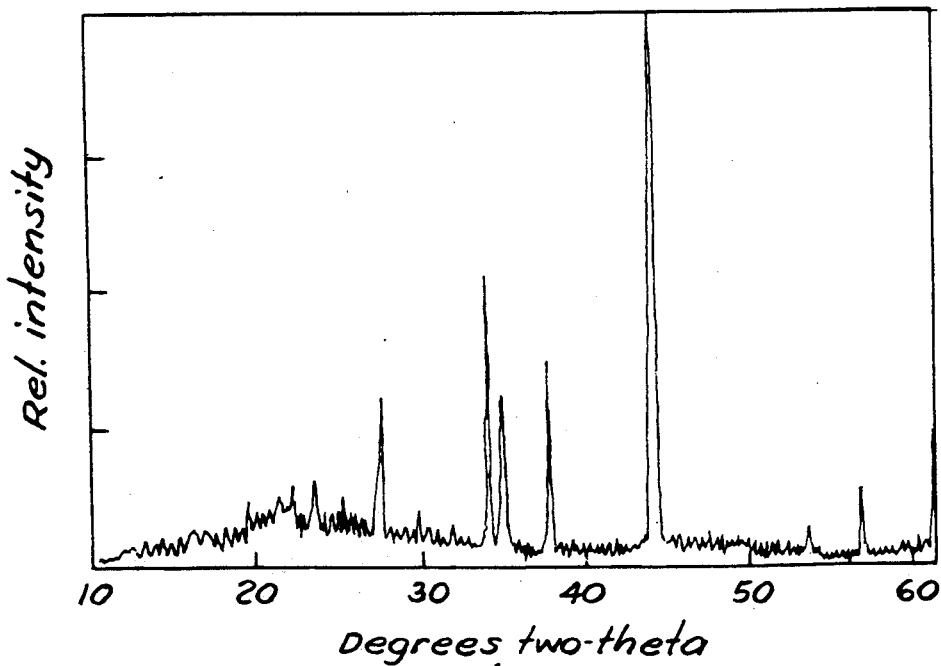
FIG. 3 is a drawing of an X-ray powder diffraction pattern obtained from a sample of the densified ceramic composition.
Figure 4:
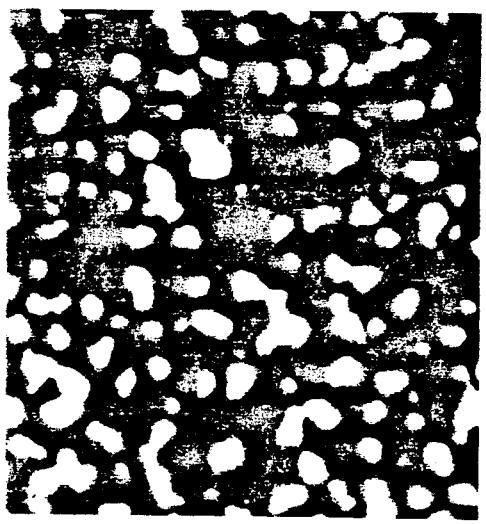
FIG. 4 is a photomicrograph of the densified ceramic composition, with a $TiB_2$ concentration of 30 percent by weight, taken at 2,000× magnification.

X-ray powder diffraction analysis of the densified ceramic composition yielded the pattern shown in FIG. 3 which shows the presence of both $B_4C$ and $TiB_2$. The 2,000× magnification photomicrograph of FIG. 4 shows the uniform dispersion of the $B_4C$ and $TiB_2$ phases in a part comprising about 30 weight percent $TiB_2$. The $TiB_2$ shows as the lighter phase, and the $B_4C$ is the darker phase.

Figure 5:
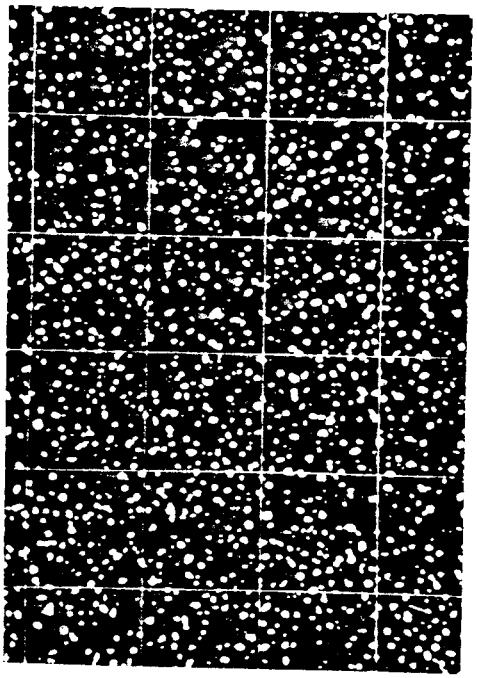
FIG. 5 is a scanning electron micrograph (SEM) of the densified ceramic composition of the Example. The $TiB_2$ concentration is 20 percent. The micrograph is divided by a grid showing 26×26 micron fields at a magnification of 778×.

The densified ceramic composition shows a unique microstructure, which can be characterized as having titanium diboride grains having an average grain size of less than or equal to about 3 microns in diameter, substantially uniformly dispersed with boron carbide grains having an average grain size of less than about 5 microns in diameter. This composition consists essentially of boron carbide and titanium diboride phases wherein the boron carbide and titanium diboride grains show a dispersion which can be characterized as having an average coefficient of variation of the area percent of the minor phase, over a titanium diboride concentration range of from more than 1 percent to about 99 percent, which is preferably less than or equal to about 10, more preferably less than or equal to about 5, as determined by scanning electron microscopic analysis at a magnification of 778× of 20 fields measuring 26×26 microns each. The coefficient of variation is defined as 100 times the standard deviation divided by the mean of the area percent of the minor phase. FIG. 5 is a scanning electron micrograph of a 20 percent $TiB_2$ powder taken at a magnification of 778×. The grid shows 20 fields measuring 26×26 microns each. Analysis of the fields was performed at a magnification of 3,000×. The densified ceramic composition can be further characterized, using the same scanning electron microscopic analysis, as preferably having a range of the area percent of titanium diboride that is less than 9, and more preferably less than about 5.

In addition to the powder and densified ceramic composition, the present invention includes the laser synthesis process by which the powder can be made. In general, this process involves the subjection of a volume of reactant gases, either in a continuous stream or as a batch, to infrared radiation from a laser preferably within the range of about 9 to 11 microns. A $CO_2$ laser is preferable. A relatively low level of irradiation is required. The reactant gases comprise volatile sources of each of the three components (boron, carbon and titanium), as well as a fourth agent, hydrogen. There are a number of possible choices for each type of reactant gas.

For example, the term "volatile boron source" refers to a boron-containing material which is gaseous at the temperature at which the material is injected into the reactant stream. Typically, volatile boron sources for use in the present process include absorbing boron sources, such as trimethyl borate and others such as other alkyl borates, trimethyl boron, boron hydrides including diborane, and boron halides, such as boron trichloride and boron trifluoride. Boron trichloride is preferred, both because it absorbs radiation strongly at the peak carbon dioxide laser wavelength of 10.6 microns and because it is sufficiently reactive to form the TiBC powder composition.

Similarly, the terms "volatile titanium source" and "volatile carbon source" refer to materials containing titanium or carbon, respectively, which are gaseous at the temperatures at which they are injected into the reactant stream. Among possible titanium sources are the titanium halides and the titanium alkoxides. Preferred here is titanium tetrachloride because it is volatile, is sufficiently reactive and reduces the incorporation of impurities (e.g., oxygen, nitrogen, sulfur, etc.) in the final powder. Methane and ethylene are the preferred carbon sources for the reaction, but any carbon source which is gaseous at the temperature at which it is mixed with the other reactant gases can be employed.

Thus, although volatile hydrocarbons such as methane, ethane, ethylene, propane, propylene, isooctane, acetylene and butylene are preferred volatile carbon sources, contemplated equivalents include other volatile carbon sources which contain one or more additional elements, e.g., chlorine or nitrogen. Among these are volatile halocarbons, provided they are suitable to react comparably to the corresponding hydrocarbon. However, some carbon sources are more sensitive than others to the reaction conditions required to produce high purity TiBC powder therefrom. Preferably, the carbon source comprises a member of the group consisting of methane, ethylene and carbon tetrachloride.

The overall stoichiometry therefore will typically resemble the equation below, depending on the carbon source used. In general, at least one of the reactants should absorb photons in the $CO_2$ laser region in order to maximize heat absorption and therefore heighten reaction efficiency. Alternatively, it is also possible to use an unreactive sensitizer, such as silicon hexafluoride, to promote absorption and increase yields. Thus, for example, a combination of boron trichloride and ethylene as reactant gases will absorb strongly at about 10.6 microns. A very generalized reaction equation, using the preferred starting materials, would be:

$$BCl_3 + C_2H_4 + TiCl_4 \rightarrow TiBC$$

In the above equation the concentrations of the reactants are adjusted in order to generate the desired final product. The greatest improvement in hardness and fracture toughness is generally found with a $TiB_2$ concentration of about 20 to about 30 weight percent, but the proportion of $TiB_2$ can range from greater than 0 to about 99 weight percent.

Essentially, two reactions are occurring simultaneously, and are endothermic. ΔH for the $B_4C$ produced using ethylene as a carbon source is about 91 kcal/mol. Using methane, the ΔH is about 115 kcal/mol. The titanium diboride reaction is also endothermic, by about 103 kcal/mol at room temperature. Anaerobic handling is recommended to help reduce competing oxidative reactions.

Figure 6:
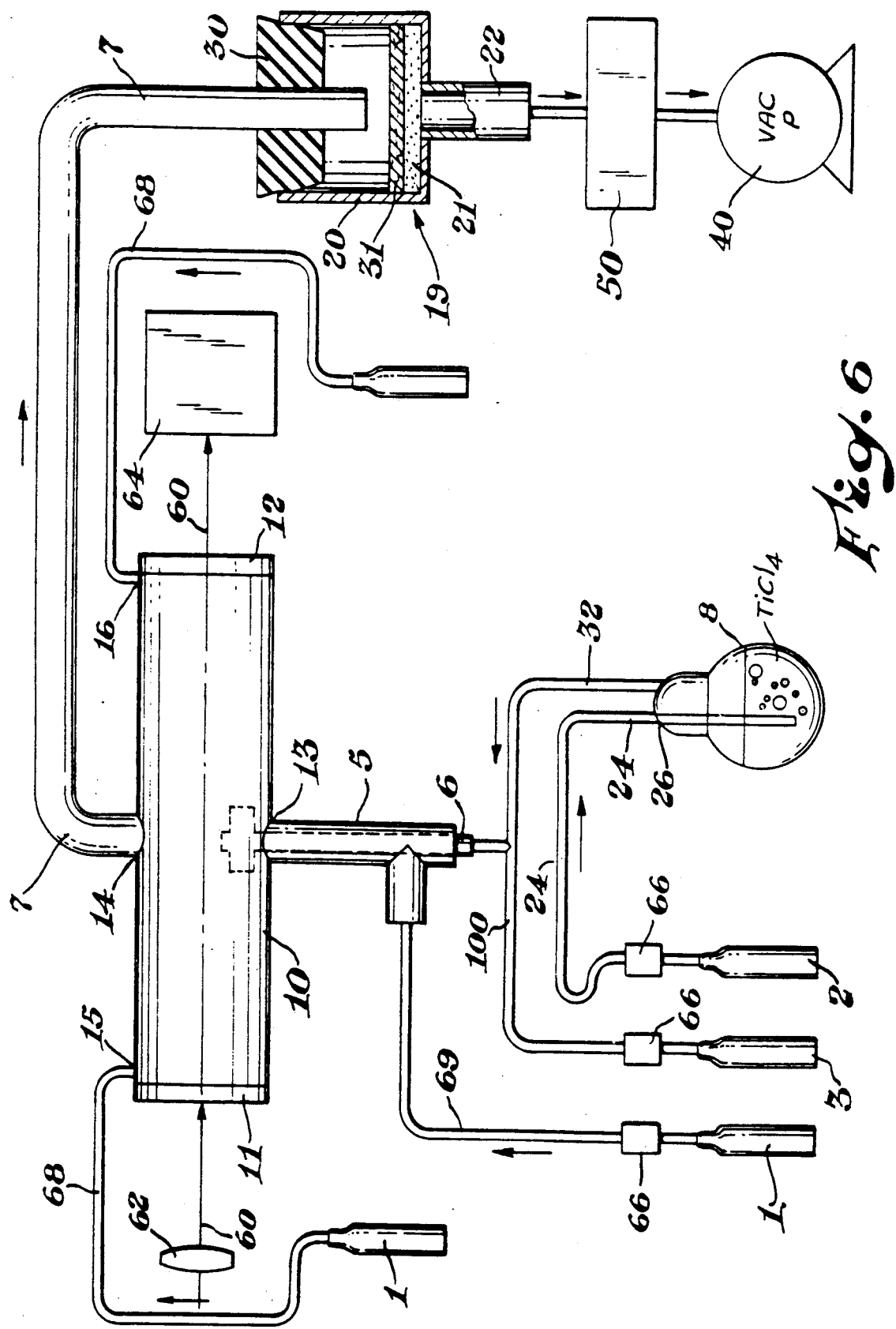
FIG. 6 is a schematic illustration of one embodiment of the laser-based reactor by which the powder of the present invention can be made.

An apparatus suitable for effecting the reaction is illustrated schematically in FIG. 6. The reactor proper is a cylindrical Pyrex glass tube or reactor 10 with KCl windows 11 and 12 firmly attached at either end. The reactor has a centrally located entrance port 13 and a centrally located exit port 14 positioned opposite entrance port 13. A gas inlet tube 5 is fitted in gas-tight connection with entrance port 13 and with the argon source 1. A smaller gas inlet tube 6 is mounted concentrically in inlet tube 5 with an open end thereof extending into reactor 10 and the other end in gas-tight connection with the source of reactant gases. One end of a gas outlet tube 7 is mounted in gas-tight connection to exit port 14 and the other is fitted in gas-tight connection into the top of a Pyrex Buchner funnel 20, which has a glass frit filter 21 and a collection tube 22, by a rubber stopper 30. Smaller gas inlet ports 15 and 16 are located proximate the KCl windows 11 and 12. The reactor is designed to inhibit the TiBC solids formed from adhering to the inside of the reactor and/or fusing together to form larger particles.

It should be noted that other reactors can be used within the scope and teachings of the instant invention. For instance, a reactor with germanium or zinc selenide windows would be acceptable. The reactants can be fed in a continuous stream or in batches.

The reaction is preferably conducted at an absolute pressure of at least about 300 Torr, more preferably about 300 to about 1,500 Torr, and most preferably about 600 to about 760 Torr.

An argon gas purge from argon source 1 is introduced proximate each window via tube 68 and through ports 15 and 16 and also concentric to the reactant gas stream via tubes 69 and 5 and through entrance port 13. The window purge serves to prevent both window overheating and the accumulation of material on the window surfaces. The concentric flow of argon serves to entrain the composite particles in the gas stream as they are formed.

The reactant gases, e.g., boron trichloride and a mixture of hydrogen and either methane or ethylene, are introduced into reactor 10 through aluminum reactant source tubes 3 and 2, respectively. At the same time liquid titanium tetrachloride is volatized in vaporizer 8. Tube 24 enters vaporizer 8 through entrance port 26, thus allowing the hydrogen and carbon sources to be mixed with the titanium tetrachloride. The volatile titanium, hydrogen and carbon sources then enter tube 32, from which they proceed together to premix with the volatile boron source, which flows through tube 100, just prior to entrance into inner tube 6. Flows can be adjusted as desired using calibrated flow controllers 66.

However, when boron trichloride is used as the volatile boron source and titanium tetrachloride is used as the volatile titanium source, it is important that the boron trichloride flow rate be increased if $BCl_3$ is to be used in the carrier gas, to account for the solubility of $BCl_3$ in $TiCl_4$. An unsaturated (with $BCl_3$) $TiCl_4$ solution results in a reduction in the concentration of $BCl_3$ in the reactant stream, reducing the net heat absorbed and the temperature of the flame. This results in the formation of a less endothermic product, titanium trichloride, rather than the desired powder composition. Alternatively, the $BCl_3$ may be mixed with the $TiCl_4/CH_4/H_2$ vapors downstream of the $TiCl_4$ reservoir, as shown in FIG. 5.

During the synthesis all gas flow rates are monitored with calibrated mass flow controllers. The $TiCl_4$ flow rate can be preferably estimated by assuming a saturated vapor of $TiCl_4$ above the temperature-controlled $TiCl_4$ reservoir. The composite powder entrained in the gas stream leaves the reactor via exit port 14, travels through gas outlet tube 7 and is collected on a filtration device 19, for instance, one comprising a filter paper disc 31 mounted on the glass filter 21 (40 to 60 micron pore size) of Buchner funnel 20. Gases leave the system via collection tube 22, which is in gas-tight connection with a (Leybold-Heraeus) corrosive gas vacuum pump 40, protected by a liquid nitrogen trap 50 which traps condensible materials. An inert fluorocarbon pump oil is used in the pump to prevent gross oil decomposition. The pressure within the reactor is monitored by a conventional Bourdon gauge (not shown) and is regulated by regulating both argon gas flow rate and vacuum pumping rate.

In alternative embodiments, the vacuum pump may be omitted, and other types of gas pumps (e.g., aspirators, etc.) substituted therefor. Further, a gas scrubber can be in fluid communication with the vacuum pump. Alternatively, the scrubber can be in direct connection with the filtration device, in order to eliminate undesirable materials from the gas stream.

In the embodiment of the drawing, the output of a $CO_2$ laser 60 (100 W cw Coherent model 40), operating multimode at 10.6 microns at an incident power of about 80 watts, is focused to about 1 to about 10 kw/cm² into the jet of reactant gases entering the reactor 10. The beam travels through the front KCl window 11 and out the rear KCl window 12. Power meter 64 measures the laser output power. An anti-reflection-coated zinc selenide lens 62 with a 200 mm focal length is used to focus the beam. However, a "defocused" beam is used; that is, the beam is focused so that the focal point of the beam is located either in front of or behind the flame produced when the laser beam ignites the gaseous mixture (the composite powder nucleates and forms in the flame). For this lens, the preferred instance between the combustion nozzle formed by the open end of inlet tube 6 projecting into entrance port 13 and the laser focal point is about 3 cm. The size of the laser spot where it impacts the reactant gases is preferably the same diameter as the diameter of the reactant gas stream in order to maximize yields; however, the diameter of the laser spot can be less than the diameter of the reactant gas stream or alternatively, greater than the diameter of the reactant gas stream.

In alternatively embodiments, the power of the laser could be increased, operating at up to 25 kw. Alternatively, a low power laser, at less than 80 watts could be used, e.g., 10 watts. With these laser powers, the reactor 10 and accompanying optics, such as the lens 62, mirrors and windows 11 and 12, would require modifications. It is preferred to use a laser operating at greater than about 50 watts. The power affects the yields obtained, in that as the power increases, so does the temperature and also the product yield.

Two factors that are preferably to be considered in making the powder composition of the present invention are its desired purity and stoichiometry. A pure powder is herein defined as one comprising preferably less than about 5 weight percent of elements other than boron, titanium, and carbon, i.e., chlorine, etc. A stoichiometric powder is herein defined as one having concentrations of boron, carbon and titanium such that, when the powder is densified, a minimum of phases other than $TiB_2$ and $B_4C$ present. Preferably less than about 5 weight percent of the densified composition will comprise these other phases, which can include free carbon, TiC, TiB, and so forth.

The stoichiometry of the powder is significantly affected by the ratio of the carbon source to the boron source in the starting gas mixture, particularly when using conventional low power lasers, e.g., about 25 watts. Ordinarily, that ratio is less, and desirably substantially less, than stoichiometric, i.e., the carbon source is preferably employed in the amount of less than about 60 percent of the boron in the boron source destined for $B_4C$. Excess elemental carbon is incorporated in the powder when greater proportions of carbon source are used. However, too little of the carbon source can also affect stoichiometry due to a relative excess of elemental boron. This, too, will result in a reduced yield of the desired product.

In view of this, from about 20 percent to 80 percent, preferably about 40 percent to about 60 percent, and most preferably about 50 percent of the stoichiometric amount of the carbon source, calculated on the amount of the boron source destined for incorporation in the powder as $B_4C$ in the starting gas mixture, is employed. However, the adverse effect of an amount of carbon source in the reaction gas mixture in excess of about 60 percent of stoichiometric can be compensated for, at least partially, by using a higher powered laser or through reactant preheating. Because the reaction is endothermic, lower laser power is required if the starting gaseous mixture is preheated, e.g., up to about 1,200° C. Preheating should be limited to a temperature below the spontaneous reaction temperature. With higher flame temperatures, up to about stoichiometric amounts of the carbon source can be employed without seriously affecting the purity of the composite produced.

The stoichiometry of the powder is also affected by the flow rate of the titanium source. In general, the efficiency of titanium incorporation increases with increasing flow rate. This is probably related to the titanium source's vapor pressures at higher reservoir temperatures. Thus, the titanium source flow rate can be adjusted according to the $TiB_2$ concentration desired, with it being preferable that substantially all of the titanium in the titanium source is incorporated as $TiB_2$. As already noted, the optimum improvements in hardness and fracture toughness are obtainable at $TiB_2$ concentrations of from about 20 weight percent to about 30 weight percent.

Finally, the stoichiometry of the composite powder is also significantly affected by the ratio of hydrogen to both the titanium and boron sources. It is preferable to use at least the stoichiometric amount of hydrogen based on the boron in the boron source destined for $B_4C$ and $TiB_2$ and the titanium in the titanium source destined for $TiB_2$, and up to about 10 times stoichiometric is more preferred. An inert carrier gas can also be combined with the hydrogen if desired.

In a preferred embodiment, because stoichiometric excesses of boron trichloride and titanium tetrachloride are employed, the unreacted boron trichloride and titanium tetrachloride are preferably recycled to the reactor, after separation of the HCl therefrom in any conventional manner. By using a continuous belt filter, an electrostatic precipitator or cyclone to collect the TiBC powder, the reaction can be conducted continuously, thereby ensuring steady state conditions. However, while not commercially desirable, it is also feasible to conduct the reaction in batches.

A good yield of powder possessing the desired stoichiometry can be obtained when the proportions of reactants, laser power, and pressure variables are optimized as already noted. A transmission electron microscopy (TEM) analysis as illustrated by the micrograph of FIG. 4, shows a powder produced experimentally having average particle diameters of about 400 Angstroms and high purity, i.e., less than about 5 weight percent of free boron and free carbon.

The following example is given for illustrative purposes only and is not intended to be, nor should it be construed as being, limitative of the scope of the invention in any way.

EXAMPLE

Using the apparatus as shown in FIG. 5, a 100 W continuous wave (cw) laser (Coherent model 40) operating multimode at 10.6 microns was focused into a jet of reactant gases. A 5 inch focal length, AR-coated zinc selenide lens 62 was used to focus the beam 60. KCl windows 11 and 12 were mounted at either end of the Pyrex reactor 10 by conventional o-ring clamp assemblies. An argon gas 1 purge was introduced at each of windows 15 and 16, and served to prevent both window overheating and the accumulation of absorbing materials on the window surfaces. A new filter paper disc and clean modified Pyrex Buchner funnel (coarse frit 40 to 60 micron pore size) 20 were installed. Three stainless steel ball valves were incorporated near the vaporizer to allow pumpdown of the system independent of the titanium tetrachloride reservoir which was maintained under an argon atmosphere.

The reactor and connecting tubing were evacuated to a pressure of less than 1 Torr and then backfilled with argon gas. The vaporizer and transfer tubes were then heated to the desired temperature (59° C. and ca. 100° C., respectively) using a standard hemispherical heating mantle and temperature controller. In Run 5, the hydrogen, methane, boron trichloride and argon purge flows were then initiated at flow rates of 132, 60, 3.75 and ca. 750 ml/min, respectively. The hydrogen and methane gases 2 were introduced into the vaporizer B containing liquid titanium tetrachloride. Care was taken to ensure that the pumping rate was neither too high nor too low since these conditions could cause titanium tetrachloride to collect in tubing 24 or in the reactor itself. The vapor pressure of titanium tetrachloride above the liquid and thus, its concentration in the hydrogen/methane stream, could be controlled through adjustment of the vaporizer temperature.

The 99.5 percent pure boron trichloride gas 3 was then injected into the methane/hydrogen/titanium tetrachloride stream. The connecting tubes 32, 6 and 5 were maintained at a temperature above that of the titanium tetrachloride solution to prevent the condensation of titanium tetrachloride. Through regulation of the throttle valve, the pressure within the reactor was fixed at about 650 to 750 Torr. The laser was then allowed to enter the reactor at an incident power of 80 watts or about 4,400 $W/cm^2$ at the reactant nozzle.

Absorption of the laser light by boron trichloride and a broad emission of light attributable to boron subchlorides resulted in the appearance of a high temperature, luminescent flame. Composite particles were formed in the flame and flowed through exit port 14 entering transfer tubing 7 and the Buchner funnel, where they were collected on the filter paper. At the conclusion of the experiment, the laser beam was blocked off and the reactant flow halted. The collection apparatus was purged with argon and transferred to an argon atmosphere glove box. The weight of product per mole of boron trichloride introduced into the reactor was then used as a quantitative measure of reaction efficiency. Some hydrolyzable material (e.g., titanium trichloride, titanium tetrachloride, boron trichloride, etc.) was collected in the filter frit and fumed (hydrolyzed) when exposed to the moist air in the laboratory. The results from six experiments are summarized in Table I below:

TABLE I[1]

| Sample | $BCl_3$[1] | $TiCl_4$[1] | $CH_4$[1] | Time (min.) | Powder collected (g) |
|---|---|---|---|---|---|
| 1 | 2.68 | 0.038 | 0.29 | 159 | 1.33 |
| 2 | 2.68 | 0.079 | 0.08 | 159 | 1.52 |
| 3 | 2.68 | 0.21 | 0.23 | 162 | 1.58 |
| 4 | 2.68 | 0.17 | 0.25 | — | 1.24 |
| 5 | 2.68 | 0.41 | 0.15 | 135 | 1.11 |
| 6 | 2.68 | 0.57 | 0.15 | — | 0.37 |

[1]All flow rates are in mmol/min and the hydrogen flow rate is 5.4 mmol/min (132 cc/min).

An absolute quantitative determination of the titanium diboride and boron carbide concentrations was not performed due to the difficulty in analyzing for boron. However, Electron Diffraction (ED) analysis of the Sample 4 powder showed the presence of $B_4C$ and $TiB_2$ in the powder. An estimate of the relative concentrations of the two compounds was obtained by measuring the carbon and titanium concentrations by combustion and EDS techniques, respectively. The results are displayed below in Table 2.

TABLE 2

| Sample | Ti* | C* | Est. $TiB_2$* | Est. $B_4C$* |
|---|---|---|---|---|
| 1 | 0.9 | 19.9 | 1.3 | 91.5 |
| 2 | 1.2 | 20.0 | 1.8 | 92.0 |
| 3 | 14.8 | 15.0 | 21.5 | 66.4 |
| 4 | 6.6 | 17.8 | 9.6 | 81.9 |
| 5 | 20.9 | — | 30.3 | — |

*In weight percent.

While still in the glove box, the samples were loaded into a 0.5 inch graphite die lined with 0.005 inch Grafoil* (*Grafoil is a trademark of the Union Carbide Corporation). The samples were then hot-pressed in vacuum at 2,200° C. and 5,000 psi in a Centorr hot press. Fracture toughness and Vickers microhardness were derived from Vickers indentations (1 kg and 4.3 kg loads).

Samples 3 and 5 were hot-pressed at 2,200° C. and 5,000 psi in vacuum. The load was applied at 2,100° C. The changes in ram displacement, which reflect the linear shrinkage of the sample showed that shrinkage stopped 20 minutes after the load was applied. Table 3 shows the Vickers microhardness and fracture toughness readings attained at the given loads:

TABLE 3

| Sample | Density ($g/cm^3$) | VHN ($kg/mm^2$) | $K_{IC}$ ($MN/m^{3/2}$) |
|---|---|---|---|
| 3 | 2.745 | 3,610 ± 340[1] | 6.7 |
| 5 | — | 3,600 ± 170[1] | — |
| 5 | — | 3,200[2] | 6.9 |

[1] 1 kg load.
[2] 4.3 kg load.

The hot-pressed samples were mounted and polished with a series of diamond grits. The microstructure consisted of a uniformly distributed "shiny" light $TiB_2$ phase dispersed in a "dull" dark $B_4C$ matrix. The average $TiB_2$ grain diameter was 1 to 2 microns. The disk was substantially dense. The microstructure of the hot-pressed Sample 3 powder was quite similar, although the $TiB_2$ was decidedly less prevalent, consistent with the reduced $TiB_2$ content in the powder. The $TiB_2$ grain sizes were again 1 to 2 microns in diameter. In both samples, the $B_4C$ grain size is a maximum of about 2 microns.

To assist in identifying the phases present, an X-ray diffraction pattern of the surface of the Sample 3 disk was obtained. The pattern showed crystalline $B_4C$ and $TiB_2$.

Bulk analysis by electron microprobe on a powder compact made from the product of Sample 4 yielded the following composition: about 6.8 weight percent titanium; about 69 weight percent boron; about 9.6 weight percent oxygen; and about 14.2 weight percent carbon. Trace elements detected were chlorine, silicon, and sodium, with k ratios of about 0.36 weight percent, about 0.02 weight percent and about 0.01 weight percent, respectively. Trace sulfur was also present but was not measured. These values yield, by computation, about 9 weight percent $TiB_2$, about 79 weight percent $B_4C$, and about 12 weight percent $H_3BO_3$. The significant percent of $H_3BO_3$ is believed attributable to the incorporation of oxygen during exposure to air.

Several physical properties of the hot-pressed disks were measured. The density of the Sample 3 disk, measured by the Archimedes method, was 2.745 $g/cm^3$. The density of the Sample 5 disk was not determined, but a polished section indicated that the sample was fully dense. Both the Vickers hardness (VHN) and the fracture toughness ($K_{Ic}$) of the two disks were measured. For both, the VHN (1 kg load) was determined to be 3,600 $kg/mm^2$. $K_{Ic}$ values were derived using the Palmqvist method from indentation cracks. The Vickers indentations in the Sample 3 samples resulted in visible cracks extending out from each vertex. The Sample 5 disk, however, was evidently tougher since cracks were, in general, not observed. Using the 1 kg indents, $K_{Ic}$ of the Sample 3 disk was 6.7 $MN/m^{3/2}$, assuming an elastic modulus (E) of 71.4 Msi (laser $B_4C$: E=71.4; $TiB_2$: E=53 Msi). Sample 5 was indented at 4.3 kg to induce the formation of cracks. At this load, the VHN was 3,200 $kg/mm^2$ and $K_{Ic}$ was 6.9 $MN/m^{3/2}$.

The microstructure of the hot-pressed samples was indicative of a very uniformly mixed powder. No titanium diboride-rich or boron carbide-rich areas were visible. This suggests that the composite powder is mixed in an intimate manner. The titanium diboride grains are somewhat larger than the grains found in pure hot-pressed laser boron carbide ($\leq 1$ micron). Titanium diboride is normally hot-pressed at 1,900° C. with facile grain growth; thus, it is unexpected that hot-pressing at a higher temperature (about 2,200° C.) would yield fine grains of both $B_4C$ and $TiB_2$ as encountered in the present invention. It is expected that densification at a lower temperature would result in an even finer-grained product.

Examination by scanning electron microscope at a magnification of 778× of 20 fields measuring 26×26 microns each reveals that the densified composition can be further characterized as consisting essentially of boron carbide and titanium diboride phases having an average coefficient of variation of the area percent titanium diboride which is about 10. It can alternatively be characterized as having a range of the area percent of titanium diboride which is about 5.

COMPARATIVE EXAMPLE

For comparative purposes a series of physically mixed titanium diboride/boron carbide composite powders over a range of compositions from 10 percent titanium diboride to 90 percent titanium diboride, were prepared and densified. For the preparation commercial titanium diboride and boron carbide powders were used. The mixing procedure was carried out in 30 ml of methanol, and 25 g of each powder was used. The boron carbide was added to the methanol first, followed by stirring and 1 minute of sonication. Then the titanium diboride was added, stirred, and again sonicated for 1 minute. This was again stirred. Finally the mixture was dried on a glass tray and then sieved to −100 mesh (150 microns). The powder compositions were hot-pressed at 2,050° C. and 5,000 psi in the same configuration as in the Example above.

Figure 7:
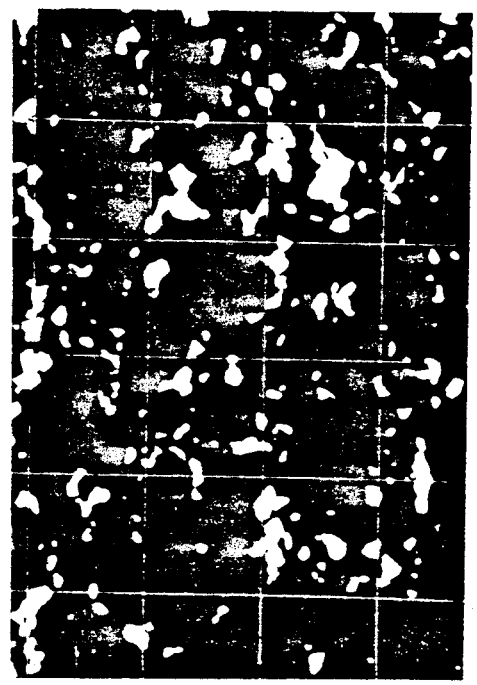
FIG. 7 is a scanning electron micrograph (SEM) of a comparative densified ceramic part prepared from a physical mixture of a 19 percent titanium diboride composition. The micrograph is divided by a grid showing 26×26 micron fields at a magnification of 778×.

Scanning electron microscopic analysis, of 20 fields measuring 26×26 microns each at a magnification of 778×, was performed on each of the physical mixture compositions, to measure coefficients of variation (C/V) and ranges, with the results shown in Table 4. The analysis of the individual fields was done at a magnification of 3,000×. The coefficients of variation and the ranges are calculated based on the minor phase, i.e., on the constituent present at a concentration of less than 50 percent. At equal concentrations the basis of calculation can be either constituent. FIG. 7 shows a scanning electron micrograph of the 19 percent $TiB_2$ densified composition, with the grid marking the 20 fields measuring 26×26 microns each. A visual comparison of FIG. 5 and FIG. 7, which have similar amounts of each constituent, i.e., 20 and 19 percent, respectively, clearly illustrates the improvement in dispersion attainable with the composition of the present invention.

TABLE 4

| Weight % $TiB_2$ | 10 | ~20 | 30 | 50 | 70 | 90 |
|---|---|---|---|---|---|---|
| Laser prep. C/V | ** | 10 | ** | ** | ** | ** |

TABLE 4-continued

| Weight % TiB$_2$ | 10 | ~20 | 30 | 50 | 70 | 90 |
|---|---|---|---|---|---|---|
| Physical Mix C/V | 52 | 66 | 31 | 25 | 14 | 13 |
| Laser Prep. Range | ** | 11–16 | ** | ** | ** | ** |
| Physical Mix Range | 2–14 | 0.5–25 | 11–33 | 0.3–46 | 46–69 | 79–88 |

**Indicates no data obtained.

What is claimed is:

1. A process which comprises subjecting reactant gases consisting essentially of a volatile boron source, a volatile titanium source, a volatile carbon source and a hydrogen source to an amount of laser radiation effective to convert at least a portion of the volatile boron, carbon and titanium sources to an intimate mixture of boron carbide and titanium diboride, said mixture being a uniformly dispersed ceramic powder such that electron probe analysis X-ray maps show substantially all discrete localized concentrations of boron carbide and titanium diboride to be less than or equal to about 3 microns in diameter, said powder being, as determined by bulk X-ray powder diffraction analysis, predominantly non-crystalline.

2. The process according to claim 1 wherein the boron source comprises a member of the group consisting of an alkyl boron, an alkyl borate, a boron hydride and a boron halide.

3. The process according to claim 1 wherein the carbon source comprises a member of the group consisting of volatile hydrocarbons and volatile halocarbons.

4. The process according to claim 1 wherein the carbon source comprises a member of the group consisting of methane, ethylene and carbon tetrachloride.

5. The process according to claim 1 wherein the carbon source is methane.

6. The process according to claim 1 wherein the carbon source is present in an amount less than the stoichiometric amount calculated on the boron in the boron source destined for B$_4$C.

7. The process according to claim 6 wherein the carbon source is present in the starting gas mixture in an amount ranging from about 20 percent to about 80 percent of the stoichiometric amount, calculated on the boron in the boron source destined for B$_4$C.

8. The process according to claim 1 wherein the hydrogen source is present in an amount at least stoichiometric, calculated on the boron in the boron source destined for B$_4$C and TiB$_2$ and the titanium in the titanium source destined for TiB$_2$.

9. The process according to claim 8 wherein the hydrogen source is present in an amount ranging from about stoichiometric to about 10 times stoichiometric, calculated on the boron in the boron source destined for B$_4$C and TiB$_2$ and the titanium in the titanium source destined for TiB$_2$.

10. The process according to claim 1 wherein the titanium source comprises a member of the group consisting of titanium halides and titanium alkoxides.

11. The process according to claim 10 wherein the titanium halide is titanium tetrachloride.

12. The process according to claim 1 wherein the titanium source is present in an amount such that substantially all titanium is combined as TiB$_2$.

13. The process according to claim 1 wherein the intimate mixture has a stoichiometry such that when the mixture is densified there is less than about 5 weight percent of phases other than TiB$_2$ and B$_4$C.

14. The process of claim 1 wherein the reaction is conducted at an absolute pressure of at least about 300 Torr.

15. The process according to claim 1 wherein the reaction is conducted at an absolute pressure of about 300 to about 1,500 Torr.

16. The process according to claim 1 wherein the reaction is conducted at an absolute pressure of about 600 to about 760 Torr.

17. The process according to claim 1 wherein the reactant gases form a continuous stream.

18. The process according to claim 1 wherein the intimate mixture exhibits average particle diameters of less than about 3 microns.

19. The process according to claim 18 wherein the average particle diameter is less than about 0.5 micron.

20. The process according to claim 1 wherein the ceramic powder also includes a substantial amount of boron-rich boron carbide.

21. The process according to claim 1 wherein the laser radiation is supplied by a CO$_2$ laser.

* * * * *